Jan. 14, 1969     L. K. SCHUSTER ET AL     3,421,934
COATING CEMENTITIOUS ARTICLES WITH HEXAVALENT
CHROMIUM-RESINOUS DISPERSIONS
Filed Feb. 23, 1965
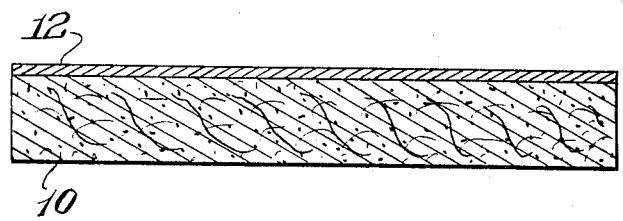
INVENTORS:
Ludwig K. Schuster.
& Singkata Tongyai
BY Connolly and Hutz
ATTORNEYS United States Patent Office
3,421,934
Patented Jan. 14, 1969

3,421,934
COATING CEMENTITIOUS ARTICLES WITH HEXAVALENT CHROMIUM-RESINOUS DISPERSIONS
Ludwig K. Schuster, Dresher, and Singkata Tongyai, Warrington, Pa., assignors to Pennsalt Chemicals Corporation, Philadelphia, Pa., a corporation of Pennsylvania
Filed Feb. 23, 1965, Ser. No. 434,214
U.S. Cl. 117—123        7 Claims
Int. Cl. B28b 11/04; B44d 1/20; C04b 41/06

ABSTRACT OF THE DISCLOSURE

Cementitious articles like asbestos-cement panels are coated with thin layer of aqueous coating dispersion of resin containing $CrO_3$ or water soluble dichromate of metal having valence greater than 1, and a reducing agent for the hexavalent chromium. Dispersion can also contain hiding pigment such as inorganic oxides. Panels are preheated, or coating dispersion is thickened with viscosity-increasing agent to keep dispersion from soaking into panel.

---

The present invention relates to coatings on articles that, like cement and concrete, are bonded together by Portland cement. These articles are referred to herein as cementitious. Asbestos-cement layers, such as layers of the type used for structural materials like siding shingles and panels, are particularly significant examples of the cementitious article.

Asbestos-cement layers of the foregoing type are made from mixtures of asbestos fibers and Portland cement, and like cement and concrete, are quite porous as well as quite alkaline. For some purposes, as for example when used as siding shingles, it is important to keep the porosity from extending completely through the thickness of the asbestos-cement layers. The prior art has developed coatings that can be applied to one surface of the layers to render that surface non-porous, but such coatings are time-consuming to apply or not sufficiently resistant to deterioration.

Among the objects of the present invention is the provision of improved techniques for coating on asbestos-cement layers or other porous alkaline materials like cement and concrete, and novel coated layers so made.

The foregoing as well as additional objects of the present invention will be more fully understood from the following description of several of its exemplifications, reference being made to the accompanying drawing in which the single figure is a sectional view of an asbestos-cement panel coated in accordance with the present invention.

It has been discovered that an asbestos-cement layer can be readily and effectively coated by preheating the layer to a temperature of from about 150° to about 300° F., applying over the surface of the preheated layer an H coating mixture (as defined below) in an amount that causes the coating mixture to spontaneously set and dry under the influence of the heat, repeating the application until the thickness of the set coating builds up to at least about 0.4 mil, and then curing the resulting coating.

Another effective coating technique pursuant to the present invention is to provide an H coating mixture having a viscosity adjusted to from about 60 to 100 centipoises measured at 78° F., applying to the layer a thickness of the mixture that produces a final coating at least about 0.4 mil thick, and then curing the applied mixture on the layer.

The H coating mixtures referred to above are aqueous dispersions of a resin containing a dissolved hexavalent chromium compound selected from the class consisting of chromic acid and water-soluble dichromates of metal having a valance greater than 1, and also containing a reducing agent compatible with the chromium compound when the mixture is applied but effective to reduce 40 to 95% of the chromium in the compound from hexavalent to trivalent condition when the mixture is dried and cured at a temperature of from about 250° to about 475° F. Coating mixtures of this kind are more fully described in U.S. Patents 3,053,693 and 3,053,702, both granted Sept. 11, 1962, and the resins used in these coating mixtures can include polyacrylic acid as well as the more conventional hydrophobic resins mentioned in those patents. The polyacrylic acid is rendered hydrophobic by the curing operation to provide a very effective non-porous cured coating that acts as a positive moisture barrier. The resin dispersion can be a solution or emulsion. Additional resins that can be used in the H coatings are those described in U.S. Patents 2,945,013 granted July 12, 1960; 2,973,285 granted Feb. 28, 1961, 2,998,330 granted Aug. 29, 1961; 3,083,177 granted Mar. 26, 1963, and 3,083,178 granted Mar. 26, 1963. Vinyl-acrylic and quaternary resins are very effective, particularly quaternized methacrolein polymers of the type used to treat nylon fibers for increasing their snag-resistance. The resins of U.S. Patents 2,741,568 granted Apr. 10, 1956, and 2,744,130 granted May 1, 1956, are particularly desirable.

As pointed out in the foregoing patents, the proportion of resin to chromium compound should be between 5:1 and 1:5, only the $CrO_3$ portion of the compound being considered in determining the ratio.

For best results when used in applying coatings pursuant to the present invention, the coating mixture is quite concentrated, that is has low water content. Effective coating mixtures have a content of non-volatiles varying from about 5% to about 50% by weight, preferably 10% to 40% by weight.

It generally takes a minimum of 0.4 mil cured coating thickness to assure adequate imperviousness, and the more dilute coating mixtures take longer to build up this thickness whereas the more concentrated mixtures tend to have a relatively short pot life. Some reducing agents, like the polyethylene glycols having molecular weights of from about 200 to 9000 or over, are more resistant to oxidation in concentrated mixtures so that they are advantageously used in such formulations.

The following examples illustrate the practice of the present invention.

Example I

A ¼ inch thick panel of asbestos-cement having a porosity of 16% is passed through an air oven where it is heated to a temperature of 275° F. As it emerges from the oven it is sprayed with the following H coating mixture applied in an amount of 3.5 grams per square foot:

| | G. |
|---|---|
| 45 weight percent emulsion in water of the copolymer of 20% ethyl acrylate with 80% methyl methacrylate | 176.6 |
| Sugar | 2.45 |
| p-Nonyl phenoxy hexaethoxyethanol | 2.47 |
| 30% by weight dispersion of $TiO_2$ in water | 85.8 |
| ZnO | 14.78 |
| $CrO_3$ | 37.31 |
| Water | 169.2 |

The sprayed on coating dries and sets in about two seconds after which the layer with the set coating is given another spray coating in exactly the same way. This second coating dries and sets in about five seconds, and a third coating is then sprayed on. The third layer dries and sets in about fifteen seconds. Substantially none of the coating penetrates into the interior of the asbestos-cement layer, and the panel has a uniform coating stratum over one entire surface. The panel thus coated has a temperature of about 150° to 175° F., and is then passed under a bank of infrared lamps that bring the coating to a temperature of 425° F. for one second. This heating cures the coating, converting it to a thermosetting impervious stratum 0.55 mil thick that seals the pores in the coated asbestos-cement surface. The resulting panel makes a very satisfactory siding shingle and shows no fading of the color of the coating when so used.

The figure of the drawing illustrates such a panel in which the asbestos-cement layer is shown at 10, and the coating at 12.

Example II

An asbestos-cement panel 3/16 inch thick and having a porosity of 19% is maintained at 70° F. and sprayed while at that temperature with the following H coating mixture:

| | G. |
|---|---|
| 46% by weight dispersion in water of an acrylate copolymer available as C-72 from the Rohm & Haas Company, Philadelphia, Pa. | 113.0 |
| Sugar | 18.94 |
| p-Nonyl phenoxy octa-ethoxy ethanol | 2.27 |
| 30% by weight dispersion of $TiO_2$ in water | 45.7 |
| 60% by weight dispersion of phthalocyanine green in water | 40.1 |
| ZnO | 22.5 |
| $CrO_3$ | 56.1 |
| Hydroxyethyl cellulose | 33.35 |
| Water | 199.65 |

This mixture has a viscosity of 87.5 centipoises at 78° F., and is sprayed on with a covering of 9.5 grams per square foot. The panel with the sprayed-on layer is then passed under and six inches away from an array of ceramic gas burners heated red hot, so that every part of the sprayed-on layer is under the burners for thirty seconds. This dries and cures the sprayed-on layer to form a hard non-porous coating 0.45 mil thick that permits the panel to be used for siding or other structural members.

For use as external structural members, the coatings of the present invention are preferably arranged to be on the outside surface of the asbestos-cement panels, and in such applications the binder used in the coating is desirably a hard resin, as for example methyl methacrylate, or cationic acrylics, or thermosetting acrylics such as those described in U.S. Patents 2,866,763 granted Dec. 30, 1958, and 2,918,391 granted Dec. 22, 1959.

With the techniques of Example I or Example II, essentially all the solid coating ingredients in the cured coatings remain on the surface of the panel and there is no problem with penetration into its interior. Such penetration is undesirable because it tends to make the panel non-porous throughout its thickness, whereas for structural purposes it is preferred for such panels to be completely porous except at one surface. In general, the porosity can vary from about 5% to 20%, that is there can be that proportion of voids in the asbestos-cement layer.

Any kind of H coating mixture can be used to make the coatings of the present invention, but purely inorganic pigments such as iron oxides, chromium oxides, lead chromates, carbon and the like are preferred for coatings exposed to the weather inasmuch as they show substantially no fading. Also the various layers used to make a single coating need not have the same pigment and the topmost layer can even have a purely resin-pigment type of formulation without the hexavalent chromium-reducing agent combination which tends to impart a greenish cast to the cured coating. In this way a perfectly white coating can be obtained.

The coating mixture formulations of the type of Example II can have many different kinds of thickening agents such as carboxyethyl cellulose, carboxymethyl cellulose, bentonite, locust bean gum, polyethylene glycols having molecular weights above 9000, and the like. Such polyethylene glycols are used in greater proportion than methyl cellulose or carboxymethyl cellulose, or locust bean gum, but these glycols are substantially completely oxidized during the curing operation so that they have substantially no deleterious effect on the final action. Bentonite also has very little effect, particularly if the curing is carried out at about 400° F. for a long time, long enough to thoroughly dehydrate it. Carboxymethyl cellulose and methyl cellulose tends to impair the water imperviousness of the coating somewhat. Instead of spraying the coating formulations, they can be applied by other methods including roller coating, brushing, and the like.

The asbestos-cement layers coated in accordance with the present invention can also have curved surfaces and can even be in the form of rods or pipes. Pipes of such construction can have their interior or external surfaces, or both, coated and the coating can penetrate the entire pipe wall thickness, though this is not desired because of the relatively large quantity of coating material that would be required.

Other examples of coating formulations that can be applied as in the technique of Example I, are:

Example III

| | G. |
|---|---|
| Alkyd resin emulsion available as "Synthemul 1505" from Reichhold Chemicals, Inc., and having 45% resin solids in water | 171.0 |
| Polyethoxylated long chain fatty acid available as "Emulfor on 870" from Antara Chemicals | 8.0 |
| Polyethylene glycol having a molecular weight of about 9000 | 4.85 |
| Black iron oxide pigment 40% dispersed in water | 132.5 |
| ZnO | 15.28 |
| $CrO_3$ | 38.55 |
| Water | 159.0 |

Example IV

| | |
|---|---|
| 20% polyacrylic acid solution in water, the polymer having a molecular weight of about 110,000 | 285.0 |
| Polyethylene glycol having a molecular weight of about 300 | 3.28 |
| 25% by weight dispersion of $TiO_2$ in water | 91.57 |
| Chrome yellow pigment paste | 20.0 |
| Molybdated chrome orange pigment paste | 22.0 |
| $CrO_3$ | 35.1 |

Example V

| | |
|---|---|
| Resin of Example 2 in U.S. Patent 2,741,568 as 30% dispersion in water by weight | 178.0 |
| Sugar | 13.72 |
| ZnO | 15.87 |
| $CrO_3$ | 40.05 |
| Brown iron oxide pigment paste | 41.0 |
| 20 weight percent $TiO_2$ dispersion in water | 68.0 |
| Water | 115.9 |

In Examples I, II, III and V the chromic acid is first dissolved in some of the water and then the ZnO is added slowly with agitation, until it is also dissolved.

Any of the formulations of Examples I, III, IV and V can be used in the coating technique of Example II by merely thickening the formulation to the specified viscosity range by one of the above-mentioned thickeners.

Obviously many modifications and variations of the present invention are possible in the light of the above teachings. It is, therefore, to be understood that within the scope of the appended claims the invention may be practiced otherwise than as specifically described.

What is claimed:

1. In the process of protecting surfaces by the application of a very thin coating of an aqueous resinous dispersion containing a water-soluble dichromate of a metal having a valence greater than 1, the resin to dichromate proportion being between 5:1 and 1:5 and also containing a reducing agent that reduces 40 to 95% of the chromium to trivalent condition when the coating is cured, the improvement according to which the surface coated is cementitious and the coating dispersion has a nonvolatile content of from about 5 to 50% by weight with its viscosity increased with a thickening agent to 60 to 100 centipoises to keep it from being absorbed into the surface.

2. The process combination of claim 1 in which the aqueous dispersion also contains a hiding pigment.

3. The process combination of claim 2 in which the pigment is an inorganic oxide.

4. The process combination of claim 1 in which the thickening agent is one that is oxidized by the hexavalent chromium when the coating is cured.

5. The process combination of claim 1 in which the thickening agent is bentonite.

6. The process combination of claim 3 in which the dichromate is zinc dichromate, the surface coated is that of an asbesto-cement panel, the resin is an acrylate and the pigment is an iron oxide.

7. An asbestos-cement panel having a coating about 0.4 mil thick of a resin-containing mixture of chromium and zinc oxides formed in situ by reduction of zinc dichromate, in which oxide mixture 40 to 95% of the chromium is trivalent the remainder being hexavalent, the resin being an acrylate in a proportion between 5:1 and 1:5 with respect to the zinc dichromate, and the coating also being colored by an iron oxide hiding pigment.

References Cited

UNITED STATES PATENTS

| | | | |
|---|---|---|---|
| 2,254,351 | 7/1944 | Schuetz | 117—126 X |
| 2,588,828 | 3/1952 | Greiner | 117—126 X |
| 3,053,693 | 9/1962 | Schuster et al. | 117—132 X |
| 3,202,638 | 8/1965 | Van Ess | 117—123 X |

RALPH S. KENDALL, *Primary Examiner.*

H. COHEN, *Assistant Examiner.*

U.S. Cl. X.R.

117—126, 161